US008972587B1

(12) United States Patent
Reeves et al.

(10) Patent No.: US 8,972,587 B1
(45) Date of Patent: Mar. 3, 2015

(54) ARBITRATION SERVER FOR DETERMINING REMEDIATION MEASURES IN RESPONSE TO AN ERROR MESSAGE FROM A CONTENT PROVIDER

(71) Applicant: Sprint Communications Company L.P., Overland Park, KS (US)

(72) Inventors: Raymond Emilio Reeves, Oviedo, FL (US); Simon Youngs, Overland Park, KS (US); Gary Duane Koller, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 98 days.

(21) Appl. No.: 13/722,694

(22) Filed: Dec. 20, 2012

Related U.S. Application Data (63) Continuation of application No. 12/732,677, filed on Mar. 26, 2010, now Pat. No. 8,370,474.

(51) Int. Cl.
| | |
|---|---|
| *G06F 15/16* | (2006.01) |
| *G06F 17/00* | (2006.01) |
| *G06F 17/30* | (2006.01) |
| *G06F 13/00* | (2006.01) |
| *G06F 11/07* | (2006.01) |

(52) U.S. Cl.
CPC ............ *G06F 11/0793* (2013.01); *G06F 13/00* (2013.01); *G06F 17/30* (2013.01); *G06F 17/00* (2013.01); *G06F 15/16* (2013.01)
USPC ........... 709/227; 709/203; 709/233; 709/237; 711/118; 711/125; 707/694; 707/758; 707/825

(58) Field of Classification Search
CPC ......... G06F 17/00; G06F 15/16; G06F 13/00; G06F 17/30
USPC .......... 719/314–315; 707/691–694, 698–699, 707/758, 825; 726/10–12; 709/203, 206, 709/215–220, 223, 227, 237; 370/242–245, 370/229, 252; 711/118, 125
See application file for complete search history.

(56) References Cited

U.S. PATENT DOCUMENTS

| | | | | |
|---|---|---|---|---|
| 6,546,392 | B1 * | 4/2003 | Bahlmann | 1/1 |
| 7,228,333 | B1 * | 6/2007 | Smith | 709/206 |

(Continued)

OTHER PUBLICATIONS

Hyokyung Bahn, "A Shared Cache Solution for the Home Internet Gateway", IEEE Transactions on Consumer Electronics, vol. 50, No. 1, Feb. 2004, pp. 168-172.*

*Primary Examiner* — Srirama Channavajjala (57) ABSTRACT

A system and media are provided for applying a policy associated with a content provider to handle an error message received from the content provider in response to a request from a user device. An error reply from the content provider in response to the request from the user device is received at a gateway. A reply to the user device is generated based on the error reply. The reply to the user device includes an indication of one or more user-agent measures for the user device to take. The user-agent measures are selected from: (A) updating a durable resource identifier to point to a new location for a resource, (B) updating a service identifier to point to a new provider of the service, (C) modifying an existing caching policy for the content provider, and (D) retrying the request at a specified future time.

11 Claims, 6 Drawing Sheets

FIG. 5.

(56) References Cited

U.S. PATENT DOCUMENTS

| 7,509,536 | B1* | 3/2009 | Kane et al. | 714/46 |
| 7,823,053 | B2* | 10/2010 | Bhamidipaty et al. | 714/799 |
| 8,370,474 | B1* | 2/2013 | Reeves et al. | 709/223 |
| 2002/0078052 | A1* | 6/2002 | Cheng | 707/10 |
| 2002/0176427 | A1* | 11/2002 | Noda et al. | 370/401 |
| 2005/0228867 | A1* | 10/2005 | Osborne et al. | 709/206 |
| 2008/0282078 | A1* | 11/2008 | Okada et al. | 713/150 |
| 2009/0228954 | A1* | 9/2009 | Hu et al. | 726/1 |

* cited by examiner

ARBITRATION SERVER FOR DETERMINING REMEDIATION MEASURES IN RESPONSE TO AN ERROR MESSAGE FROM A CONTENT PROVIDER

CROSS-REFERENCE TO RELATED APPLICATIONS

This application is a continuation of U.S. application Ser. No. 12/732,677, filed Mar. 26, 2010, entitled "Arbitration Server For Determining Remediation Measures In Response To An Error Message From A Content Provider," which is herein incorporated by reference.

SUMMARY

Embodiments of the invention are defined by the claims below, not this summary. A high-level overview of various aspects of the invention are provided here for that reason, to provide an overview of the disclosure and to introduce a selection of concepts that are further described below in the detailed-description section. This summary is not intended to identify key features or essential features of the claimed subject matter, nor is it intended to be used as an aid in isolation to determine the scope of the claimed subject matter.

In a first aspect, a system is provided for applying a policy associated with a content provider to handle an error message received from the content provider in response to a request from a user, where the policy includes a remediation measure. The system includes a gateway that is configured to (A) forward user requests from users to content providers, (B) receive an error message from a content provider in response to a user request forwarded to the content provider, (C) check a cache of remediation measures for an appropriate remediation measure to handle the error message, (D) when the appropriate remediation measure is not found in the cache, then request the appropriate remediation measure from an arbitration server, and (E) apply the appropriate remediation measure in response to receiving the error message. The system also includes an arbitration server that is configured to (A) receive the arbitration request from the gateway, (B) update an error database server with details of the error message, (C) retrieve from an arbitration database the appropriate remediation measure, and (D) send the appropriate remediation measure to the gateway. The system further includes the error database server that is configured to (A) store details of error messages received from a plurality of arbitration servers, (B) store remediation measures; (C) determine the appropriate remediation measure based on the details of the error message, and (D) send the appropriate remediation measure to the arbitration server in response to the arbitration request from the arbitration server.

In a second aspect, a set of computer-useable instructions provide a method of applying a policy associated with a content provider to handle an error message received from the content provider in response to a request from a user device. The method includes receiving from a gateway an error reply from the content provider in response to the request from the user device, and generating a reply to the user device based on the error reply. The reply to the user device includes an indication of one or more user-agent measures for the user device to take. The user-agent measures are selected from: (A) updating a durable resource identifier to point to a new location for a resource, (B) updating a service identifier to point to a new provider of the service, (C) modifying an existing caching policy for the content provider, and (D) retrying the request at a specified future time.

BRIEF DESCRIPTION OF THE SEVERAL VIEWS OF THE DRAWINGS

Illustrative embodiments of the present invention are described in detail below with reference to the attached drawing figures, and wherein.

DETAILED DESCRIPTION

The subject matter of embodiments of the present invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of the present invention. The following is a list of these acronyms:
CP Content Provider
ISP Internet Service Provider Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Finally, it is implied that media is non-transitory.

Figure 1:
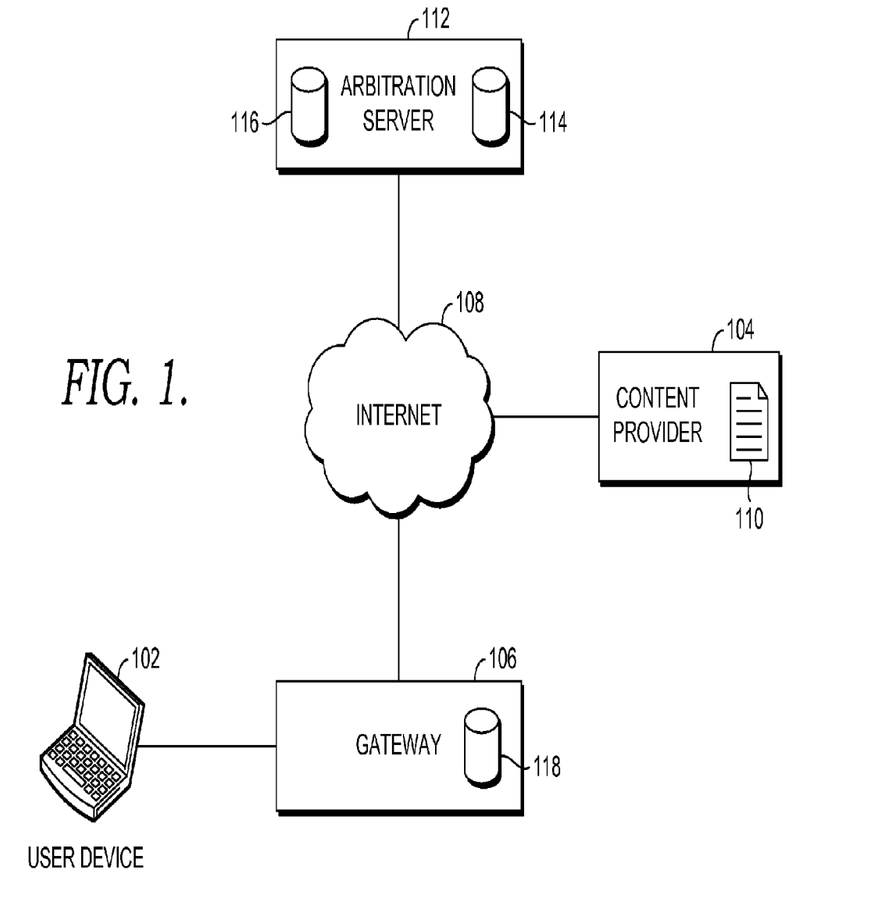
FIG. 1 depicts a block diagram of a simplified exemplary system in accordance with an embodiment of the present invention.

Turning now to FIG. 1, a block diagram of an exemplary system in accordance with an embodiment of the present invention is presented. A user device 102 connects to a content provider 104 via a gateway 106 and the Internet 108 in order to request a resource 110. In one embodiment, user device 102 takes the form of a desktop computer connecting via a wired Internet connection. In another embodiment, user device 102 takes the form of a laptop connecting via a wireless Internet connection. In yet another embodiment, user device 102 takes the form of a smartphone connecting via a wireless telecommunications network. Other embodiments of user device 102 are possible without departing from the scope of the claims below.

Similarly, gateway 106 can take various forms. In one embodiment, gateway 106 is a consumer electronics device providing network connectivity to one or more devices in a user's home. In another embodiment, gateway 106 is a server computer at an Internet service provider forwarding requests for a plurality of users. In yet another embodiment, gateway 106 is integrated into user device 102. Other embodiments are possible without departing from the scope of the claims below.

In one embodiment of the present invention, content provider 104 is a web server on the Internet 108 and resource 110 is a web page. In another embodiment, content provider 104 is an email server, and resource 110 is an email message or mailbox metadata. In yet another embodiment, content provider 104 is a server providing a data feed for an application. In this case, resource 110 could include such information as current weather conditions, current financial information, or sports results. In one variation of the exemplary system shown, user device 102 connects to content provider 104 not to request a resource, but to communicate with another user device via content provider 104. In one embodiment of this variation, content provider 104 is an instant messaging server. In another embodiment, content provider 104 is Voice-over-Internet-Protocol server. In yet another embodiment, content provider 104 is a server for video chat. Other embodiments of content provider 104 are possible without departing from the scope of the claims below.

It will occasionally be the case that content provider 104 cannot provide resource 110 to user device 102. This may be the case because resource 110 has moved to a new location, or because resource 110 is no longer available, or because user device 102 is not authorized to access resource 110. Another possibility is that the server process providing resource 110 on content provider 104 is unavailable, or that content provider 104 is itself unavailable. Regardless of the cause, the lack of availability of resource 110 will result in decreased user satisfaction, compounded by the various and frequently unhelpful error replies generated by the different failure modes described above. In order to remedy this situation, gateway 106 can apply a remediation policy to the error replies returned by content provider 104 in order to decrease user dissatisfaction.

A wide variety of remediation policies are possible, depending on the type of service provided by content provider 104, resource 110, and the type of error reply received. In the case where resource 110 has moved, a remediation policy may be as simple as automatically resending the request for resource 110 at its new location, or rewriting the error message to include a redirection to the new location. In the case where user device 102 is not authorized to access resource 110, remediation might include replacing an "access forbidden" message with a redirection to a login page where the user can provide credentials necessary for user device 102 to access resource 110. Another example is the case where resource 110 is no longer available. In this case, the only remediation possible may be rewriting the error message into a user-friendly format and notifying content provider 104 of the error. This rewriting may include modifying a response status code in the error message in order to, for example, change how the error message is presented by user device 102 to the user. Also possible is a trivial remediation policy of simply passing the error message to the user unchanged.

In the embodiment where content provider 104 is providing a data feed for an application, other remediation policies may be available if a request for the data feed fails. If the feed updates on a regular basis, for example, one policy might be to simply replace an error message with a response including the most recently updated version of the data feed for a first error message, but handling a second successive failure differently. For many data feeds, multiple sources are available for the same data; thus, another remediation policy in this case is to automatically send another request for the same data from an alternate content provider.

Another set of remediation policies applies not to the current request, but rather to future requests. For example, if an error message indicates that resource 110 is gone permanently, future requests for resource 110 might be rejected by the gateway rather than forwarded to content provider 104 for rejection. Similarly, an error message indicating that resource 110 has moved permanently could result in future requests for resource 110 automatically being rewritten to request the resource from its new location. In the case of a data feed, a persistent error could result in future requests being rerouted to an alternate content provider.

Given the wide variety of remediation policies available, multiple policies will often be applicable for a given error message, and the determination of which policy to apply may be subject to criteria including errors observed by other gateways, administrative decisions, and stated content provider preference. Accordingly, gateway 106 is connected to arbitration server 112 via Internet 108; thus gateway 106 can, upon encountering an error message it does not know how to handle, issue an arbitration request to arbitration server 112.

In one embodiment, arbitration server 112 is a server computer connected to gateway 106 and content provider 104 via Internet 108. In another embodiment, it is integrated into gateway 106. In one embodiment, arbitration server 112 contains an arbitration database 114 of arbitration agreements with content providers such as content provider 104. This arbitration agreement specifies the policies content provider 104 would prefer for various types of errors, as well as injunction measures content provider 104 will take to remedy errors that are reported to it by arbitration server 112. These injunction measures can include such actions as altering an error message to conform to a standard format, removing a resource identifier pointing to a resource which has been removed, updating a resource identifier pointing to a resource which has been moved to reflect the new location of the resource, and restoring the availability of an unavailable service or server. In another embodiment, an arbitration agreement also contains punitive measures arbitration server 112 can take if content provider 104 fails to remedy errors reported to it as agreed. Punitive measures can include such actions as blocking traffic into content provider 104 or redirecting requests for service provided by content provider 104 to another content provider.

Thus, upon receiving an arbitration request from gateway 106, arbitration server 112 can consult arbitration database 114 to determine the appropriate policy to apply to the error response received by gateway 106. In one embodiment, if no arbitration agreement has been reached with the content provider 104 from which the error message was received, a default remediation policy is employed. The appropriate remediation policy is then sent in an arbitration policy to gateway 106. In one embodiment, the details of the error message sent by content provider 104 are stored in an error database 116. By collecting and analyzing error reports from multiple gateways, arbitration server 112 can preemptively send remediation policies to gateways such gateway 106. Error database 116 also allows arbitration server 112 to determine whether content providers such as content provider 104 are complying with their arbitration agreements. If arbitration server 112 determines that content provider 104 is failing to comply with its arbitration agreement, arbitration server 112 can preemptively send gateway 106 a remediation policy implementing the punitive measures as specified in the arbitration agreement.

In one embodiment of the present invention, gateway 106 stores remediation policies with information on the content providers to which they apply and their validity periods, whether received in response to an arbitration request or as sent preemptively by arbitration server 112 in a remediation policy cache 118. Remediation policy cache 118 can then be checked upon the receipt of an error message or resource request to see if an appropriate remediation policy is already known to gateway 106; if such a policy is known, it can be applied without having to communicate with arbitration server 112.

Figure 2:
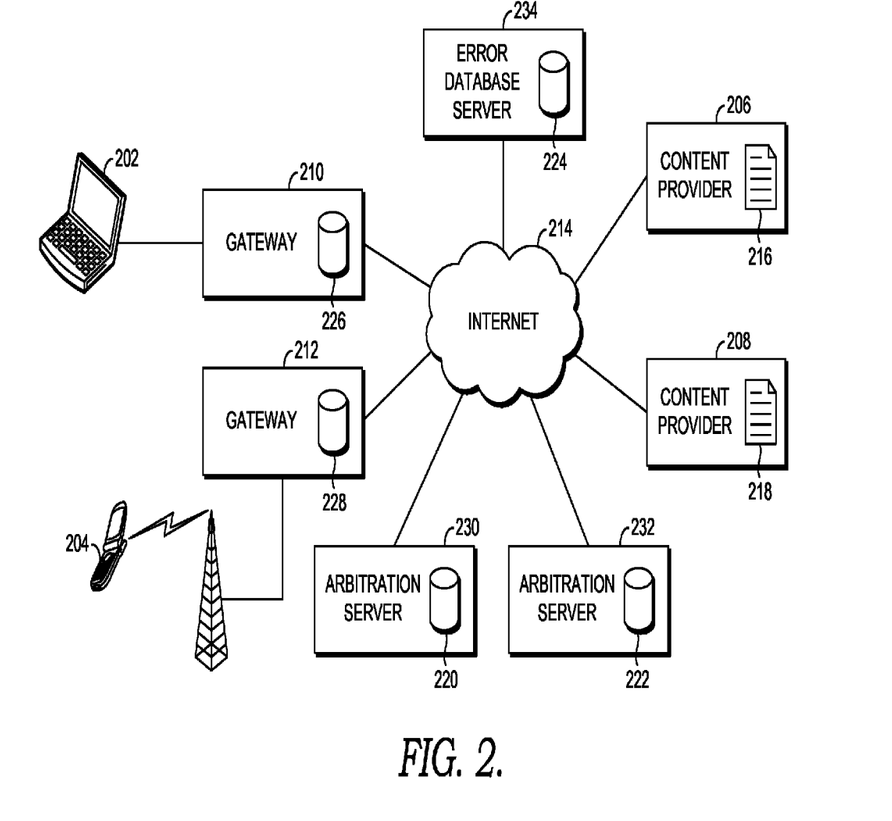
FIG. 2 depicts a block diagram of a more complex exemplary system in accordance with another embodiment of the present invention.

Turning now to FIG. 2, a more complex exemplary embodiment of the present invention is presented. Several components in FIG. 2 correspond to those in FIG. 1; user device 202 and user device 204 correspond to user device 102. Content provider 206 and content provider 208 correspond to content provider 104. Gateway 210 and gateway 212 correspond to gateway 106. Internet 214 corresponds to Internet 108. Resource 216 and resource 218 correspond to resource 110. Arbitration databases 220 and 222 correspond to arbitration database 114. Error database 224 corresponds to error database 116. Remediation policy cache 226 and remediation policy cache 228 correspond to remediation policy cache 118.

In this embodiment, multiple arbitration servers are present: arbitration server 230 is under the administrative control of a first Internet service provider (ISP), which controls gateway 210, and arbitration server 232 is under the administrative control of a second ISP, which controls gateway 212. Because the first ISP and the second ISP may have different default remediation policies, and may have negotiated different arbitration agreements with different content providers, arbitration server 230 has an arbitration database 220 that is separate from the arbitration database 222 used by arbitration server 232. However, arbitration server 230 and arbitration server 232 are both connected to error database server 234 via Internet 214. In this embodiment, those errors originating at content provider 206, intercepted by gateway 210 and forwarded to arbitration server 230 for arbitration, and those errors originating at content provider 208, intercepted by gateway 212 and forwarded to arbitration server 232 for arbitration are both sent to error database server 234 to be stored in error database 224 by the respective arbitration servers. This results in a collection of errors larger than that which could be collected by either arbitration server acting alone and allows a more comprehensive analysis of error patterns and generation of preemptive remediation policies.

In one embodiment, this analysis and generation is carried out separately by arbitration server 230 and arbitration server 232. In another embodiment, the analysis and generation is carried out by error database server 234 and the policies are sent to arbitration servers 230 and 232 for approval and forwarding to gateways 210 and 212. In yet another embodiment the policies are generated by error database server 234 and sent directly to gateways 210 and 212. In another embodiment, the functionality of error database 234 is co-located with that of an arbitration server.

Figure 3:
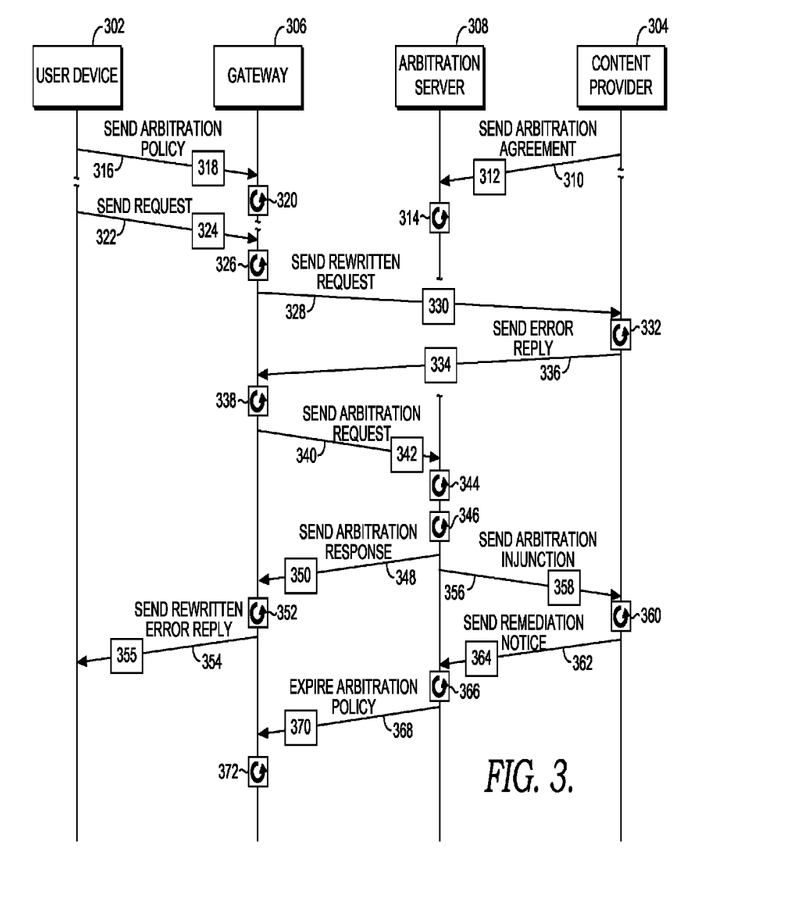
FIG. 3 depicts an exemplary data flow diagram for a system in accordance with an embodiment of the present invention.

Turning now to FIG. 3, an exemplary data flow diagram for one embodiment of the present invention is presented. Note that several components of FIG. 3 correspond to those of FIG. 1: user device 302 corresponds to user device 102, content provider 304 corresponds to content provider 104, gateway 306 corresponds to gateway 106 and arbitration server 308 corresponds to arbitration server 112. At step 310, content provider 304 sends an arbitration agreement 312 to arbitration server 308. Arbitration agreement 312 can include content provider 304's preferred remediation policies, the injunction measures that content provider 304 has agreed to undertake to fix errors reported to it by arbitration server 308, and the punitive actions that arbitration server 308 can take if content provider 304 fails to honor that agreement. In one embodiment, this agreement is the result of offline negotiation. In another embodiment, parts of this agreement can be automatically updated unilaterally. At step 314, arbitration server 308 updates arbitration database 114 with the updated information from the arbitration agreement. Similarly, at step 316, user device 302 sends a preferred set of arbitration policies 318 to gateway 306. In one embodiment, user-provided arbitration policies 318 override arbitration policies specified in arbitration agreement 312 by content provider 304. In another embodiment, arbitration policies 318 are used only when content provider 304 has not provided an applicable policy. At step 320, gateway 306 updates remediation policy cache 118 with arbitration policies 318. Step sequences 310-316 and 316-320 are both optional; in one embodiment of the present invention, if neither the user nor content provider 304 has specified an applicable arbitration policy, a default policy is used.

Some time later, at step 322, user device 302 sends a request 324 for a resource 110 to content provider 304 via gateway 306. In one embodiment, gateway 306 rewrites this request to include a list of the arbitration policies it supports at step 326. At step 328, gateway 306 forwards the rewritten request 330 to content provider 304. At step 332, content provider 332 determines that it cannot satisfy request 330, and sends an error reply 334 at step 336. In various embodiments, this error detection and notification may occur at other places in the network for different types of errors.

At step 338, gateway 306 receives error reply 334 and checks remediation policy cache 118 to determine if it currently has an arbitration policy appropriate for handling error reply 334. In this example, it does not, so at step 340 it sends an arbitration request 342 including the details of error reply 334 to arbitration server 308. At step 344, arbitration server 308 stores the details of error reply 334 in error database 116. At step 346 arbitration server 308 checks arbitration policy database 114 for an appropriate policy. In one embodiment, if an appropriate policy is not found, a default policy is used instead. At step 348, arbitration server 308 sends this policy in an arbitration response 350 to gateway 306. At step 352, gateway stores this policy in remediation policy cache 118, and uses it to remediate error reply 334. At step 354, gateway 306 sends the modified error reply 355 to user device 302 for display to the user.

Meanwhile, at step 356, arbitration server sends an arbitration injunction 358 to content provider 304 notifying it of the error. In one embodiment, arbitration injunction 358 also includes the actions that content provider 304 has agreed to perform to fix the error condition and the punitive actions content provider 304 will be subject to if it fails to fix the error. At step 360, content provider 304 fixes the error condition and at step 362 it sends a remediation notice 364 to arbitration server 308. At step 366, arbitration server 308 records in error database 116 and/or arbitration agreement database 114 that the error condition has been fixed. At step 368 arbitration server 308 pushes an arbitration policy expiration notice 370 to gateway 306. Finally, at step 372, gateway 306 receives notice 370 and removes the arbitration policy from remediation policy cache 118.

Figure 4:
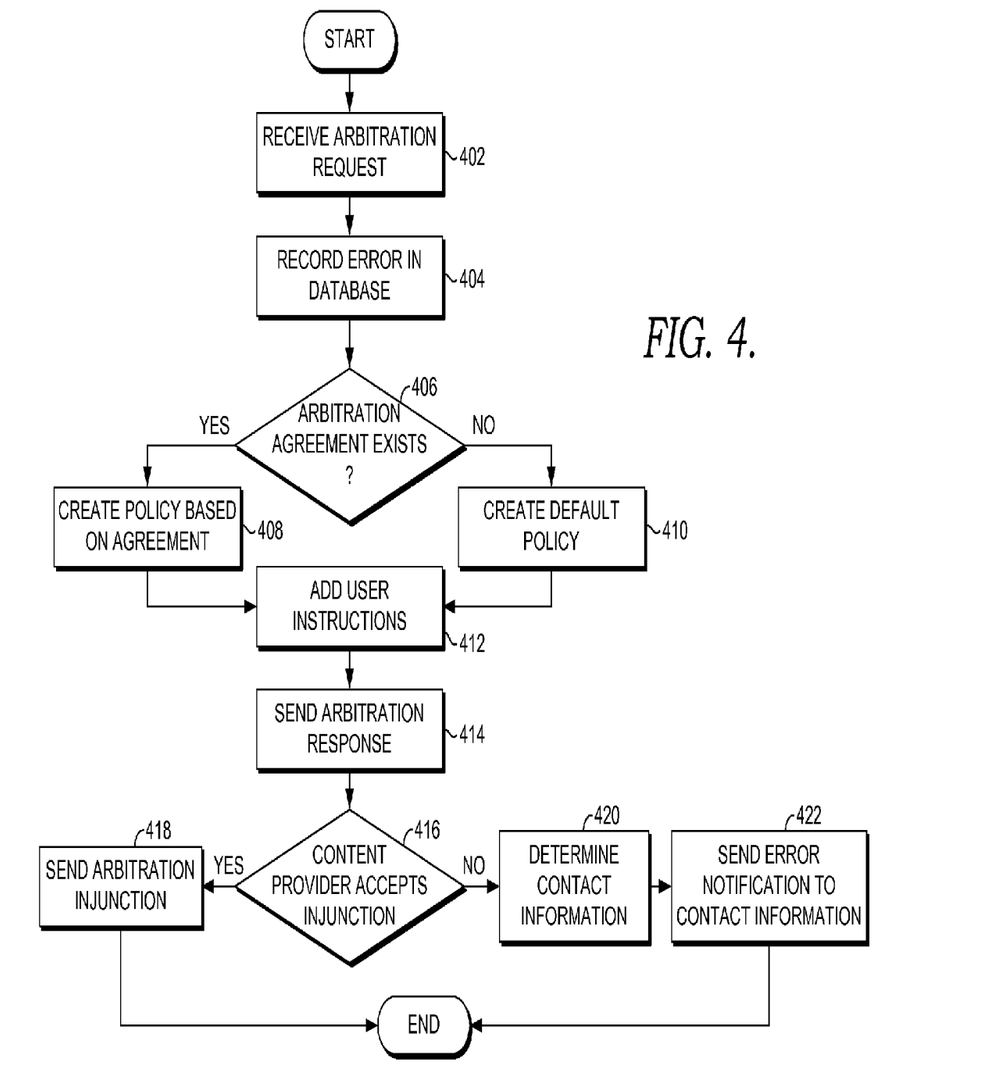
FIG. 4 depicts a flow diagram for a method in accordance with an embodiment of one aspect of the present invention.

Turning now to FIG. 4, an exemplary method in accordance with one embodiment of the present invention is presented. In one embodiment, this method is executed by an arbitration server such as arbitration server 112. In step 402, an arbitration request 342 is received. In one embodiment, this request is received from a gateway such as gateway 106. In another embodiment, it is received from a user device such as user device 102. In step 404, the details of an error message such as error message 334 contained in arbitration request 342 are stored in error database 116. At step 406, arbitration database 114 is consulted to determine whether an appropriate arbitration agreement 312 exists. In various embodiments, the determination as to whether an agreement is appropriate is based on factors including the content provider 104 from which error message 334 originated, the user device such as user device 102 for which error message 334 was intended, the type of error, the time at which the error occurred, the geographic location of user device 102, and the type of content requested in content request 324 that caused error message 334 to be generated.

If a matching arbitration agreement 312 is found at step 406, an arbitration policy based on arbitration agreement 312 is created at step 408. If no matching arbitration agreement 310 was found at step 406, a default arbitration policy is used instead at step 410. In one embodiment, if arbitration request 342 indicates that user device 102 supports them, one or more instructions for user device 102 are added at step 412. Instructions for user device 102 can include updating a durable resource identifier such as a bookmark, changing the selected provider for a service or data feed, modifying a caching policy, and retrying request 324 at a specified time in the future. At step 414, the arbitration policy and any instructions for user device 102 are sent in arbitration response 350 to the originator of arbitration request 342.

At step 416, it is determined whether content provider 104 can accept an arbitration injunction such as arbitration injunction 358. In one embodiment, this determination is based on whether an arbitration agreement exists with content provider 104. If it is determined that content provider 104 supports arbitration injunctions, an arbitration injunction 358 is generated and sent to content provider 104 at step 418. In one embodiment, if it is determined that content provider cannot accept arbitration injunctions, contact information for content provider 104 is determined at step 420. In one embodiment, this contact information is determined by consulting a publically available database, such as the WHOIS database, which includes contact information for the domain name associated with content provider 104. In another embodiment, this contact information is generated by creating an email address where the username is a role address, such as "webmaster," "www," "postmaster," "errors," etc., and the domain name is a domain name associated with content provider 104. Other embodiments are possible without departing from the scope of the claims below. This contact information is then used to send an error report including some details from error message 334 to content provider 104 at step 422.

Figure 5:
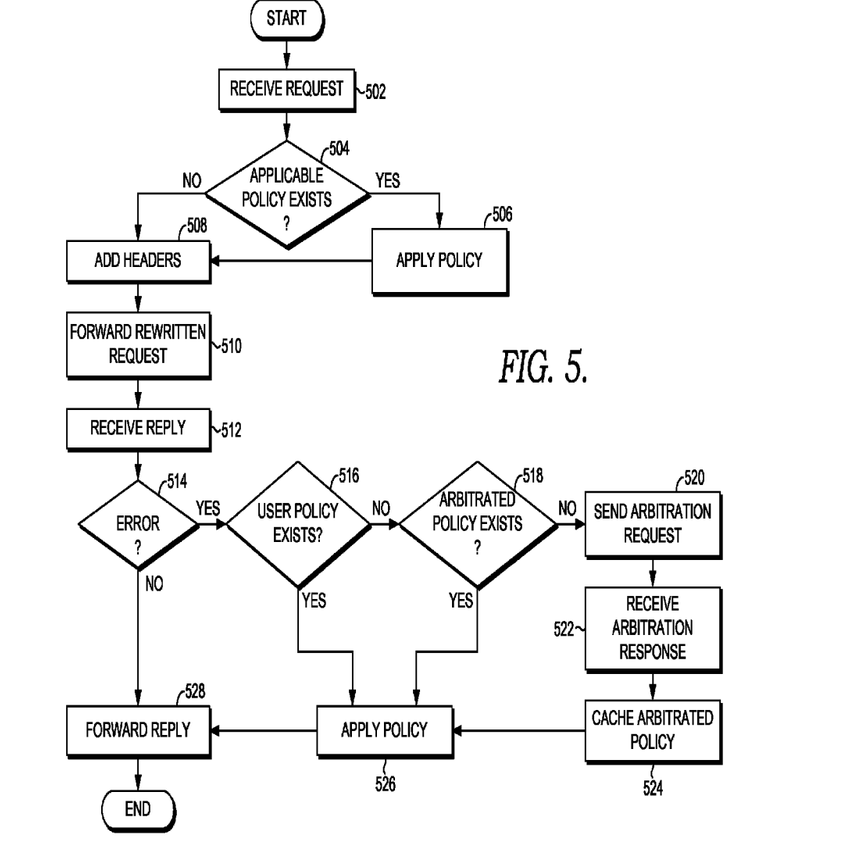
FIG. 5 depicts a flow diagram for a method in accordance with an embodiment of another aspect of the present invention.

Turning now to FIG. 5, an exemplary method in accordance with one embodiment of the present invention is presented. In one embodiment, this method is executed by a gateway such as gateway 106. At step 502 a resource request 324 is received. In one embodiment, resource request 324 is received from a user device such as user device 102. At step 504, remediation policy cache 118 checked to determine if an arbitration policy exists which should be applied to resource request 324. Examples of such policies include rejecting traffic into a given content provider such as content provider 104, providing a cached version of the requested resource 110, and rewriting resource request 324 to request resource 110 from an alternate content provider such as content provider 208.

If such a policy exists, it is applied to resource request 324 at step 506. In one embodiment, regardless of whether an applicable policy was found at step 504, resource request 324 is rewritten to include a header indicating the policies that the current device supports at step 508. Next, at step 510, the rewritten resource request 330 is forwarded to the appropriate content provider.

A reply to this request is received at step 512; at step 514 it is determined whether this reply is an error message such as error message 334. If the reply is an error message, remediation policy cache 118 is checked to determine if an applicable user arbitration policy exists at step 516. If no applicable user arbitration policy exists, remediation policy cache 118 is checked to determine if an arbitrated policy exists at step 518. In no applicable arbitrated policy exists, an arbitration request is sent at step 520 to an arbitration server such as arbitration server 112. This request is received at step 402 of FIG. 4, and its processing is further detailed there.

At step 522, the arbitration response sent at step 414 is received, and at step 524, the arbitration policy it includes is stored in remediation policy cache 118. In various embodiments, steps 516, 518, and 520 et seq. may be performed in different order. At step 526, the policy obtained at step 516, 518, or 524 is applied to the response received at step 512. In one embodiment, this may include adding user instructions as added in step 410 to the reply. Finally, at step 528, the response, rewritten or as received if it was determined at step 514 not to be an error message, is forwarded to user device 102.

Figure 6:
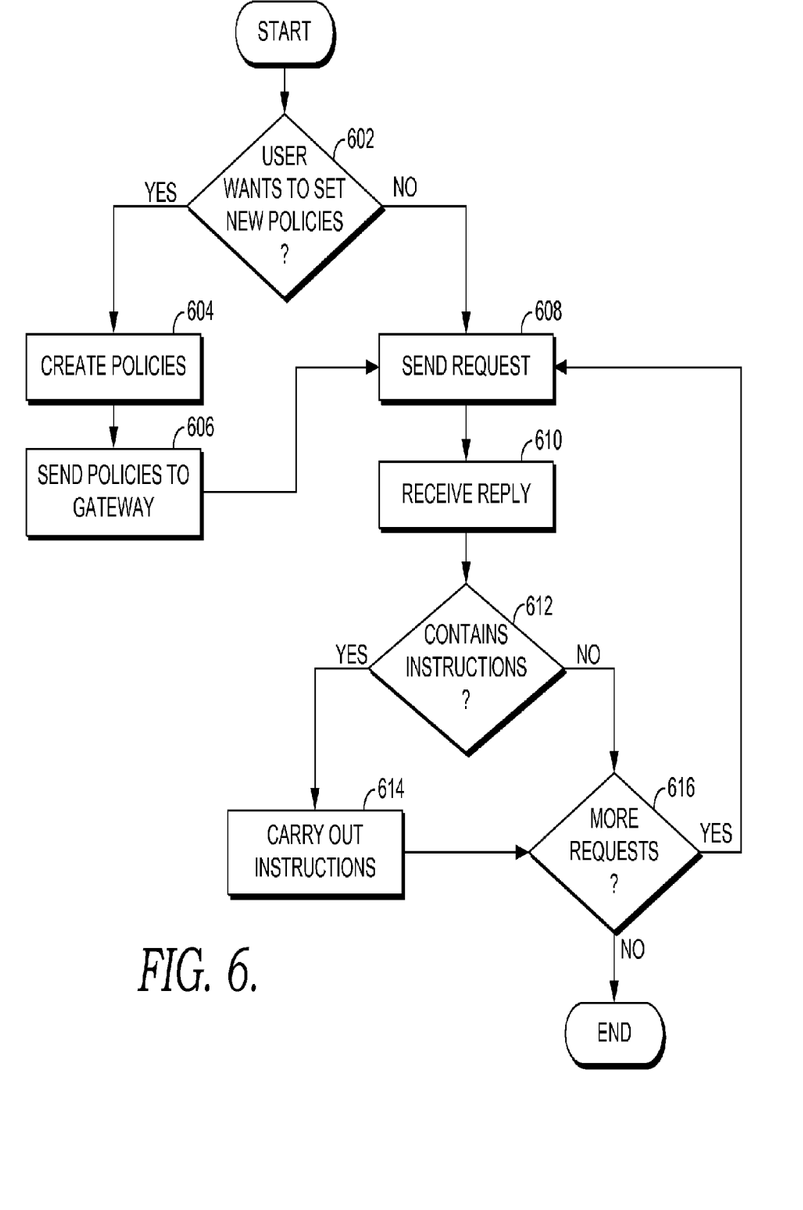
FIG. 6 depicts a flow diagram for a method in accordance with an embodiment of a third aspect of the present invention.

Turning now to FIG. 6, an exemplary method in accordance with one embodiment of the present invention is presented. In one embodiment, this method is executed by a user device such as user device 102. The method begins at step 602, when it is determined whether a user wishes to specify user policies. This determination can be made in a variety of ways; in one embodiment, a graphical user interface is provided to the user during the initial setup of user device 102. In another embodiment, a standard error page provides a link that allows the user to specify user policies in response to receiving an error.

If the user chooses to create policies, these policies are created at step 604. User policies express error remediation preferences similar to arbitrated policies, and can express policies such as passing error messages from content providers unchanged, providing cached content if available, rewriting an error reply to include a redirection to an alternate provider for the requested content, rewriting an error message to include an alternate status code, and providing a standardized error page. Other policies are possible without departing from the scope of the claims below. Once created, these policies are sent to a gateway such as gateway 106 at step 606. In one embodiment, this gateway takes the form of software running on the user device.

After these policies are specified, or if the user does not wish to specify new policies, a resource request 324 for a resource such as resource 110 is sent to content provider 104 via gateway 106 at step 608. Note that a significant interval may elapse between step 602 or 606 and step 608. This request is intercepted by gateway 106 at step 502 of FIG. 5, and its processing is further detailed in FIG. 5. At step 610, the reply sent in step 528 of FIG. 5 is received. If this reply was an error message before being rewritten by gateway 106, it may contain instructions for the user device, as described previously. At step 612, it is determined if the reply received at step 610 contains user instructions. If it does, these instructions are carried out at step 614. Next, at step 616, it is determined if more requests remain to be sent. If so, steps 608 et seq. are repeated, otherwise the method terminates.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A system for applying a policy associated with a content provider to handle an error message received from the content provider in response to a request from a user, wherein the policy includes a remediation measure, the system comprising:
   a gateway that includes one or more processing devices, wherein the gateway is configured to
      A) forward user requests from users to content providers,
      B) receive an error message from a content provider in response to a user request forwarded to the content provider,
      C) check a cache of remediation measures for an applicable remediation measure to handle the error message based on one or more details of the error message,
      D) when the applicable remediation measure is not found in the cache, then request the applicable remediation measure from an arbitration server, and
      E) apply the applicable remediation measure in response to receiving the error message;
   an arbitration server that includes one or more processing devices, wherein the arbitration server is configured to
      A) receive the arbitration request from the gateway,
      B) update an error database server with the one or more details of the error message,
      C) retrieve from an arbitration database the applicable remediation measure, and
      D) send the applicable remediation measure to the gateway; and
   the error database server that includes one or more processing devices, wherein the error database server is configured to
      A) store the one or more details of error messages received from a plurality of arbitration servers,
      B) store remediation measures,
      C) determine the applicable remediation measure based on the one or more details of the error message, and
      D) send the applicable remediation measure to the arbitration server in response to the arbitration request from the arbitration server.

2. The system of claim 1, wherein the one or more details of the error message include one or more of an identification of the user or an identification of the content provider.

3. The system of claim 2, wherein the arbitration server is further configured to
   A) check the error database server for a count of errors associated with the content provider, and
   B) when the count exceeds a specified threshold, push a remediation policy to the gateway.

4. The system of claim 1, wherein the arbitration server is further configured to
   determine, on the basis of an existing arbitration agreement with the content provider, a user-agent measure for the user device to perform in response to the error, the user-agent measure selected from the set consisting of
      A) update a durable resource identifier to point to a new location for the resource,
      B) update a service identifier to point to a new provider of the service,
      C) modify an existing caching policy for the content provider, and
      D) resubmit the request at a specified future time; and
   include the user-agent measure in the applicable remediation measure.

5. The system of claim 1, wherein the arbitration server is further configured to
   determine, on the basis of an existing arbitration agreement with the content provider, one or more injunction measures the content provider is obligated to perform to remediate the error, the one or more injunction measures selected from the set consisting of:
      A) alter an error message to conform to a specified format;
      B) remove a hyperlink that points to a removed resource;
      C) update a hyperlink that points to a relocated resource to point to an updated location for the resource; and
      D) restore availability of a nonresponsive server; and
   send an arbitration injunction that includes the one or more injunction measures to the content provider.

6. The computer-readable media of claim 5, wherein the arbitration injunction further includes one or more punitive actions to perform if the content provider fails to conform to the arbitration injunction.

7. The computer-readable media of claim 5, wherein the arbitration server is further configured to
   A) receive a remediation notice indicating that the error has been corrected subsequent to the arbitration injunction sent to the content provider, and
   B) push an update to the gateway indicating that the remediation policy is no longer valid.

8. The system of claim 1, wherein the arbitration server is further configured to
   A) determine that the content provider cannot accept an arbitration injunction;
   B) automatically determine contact information for the content provider; and
   C) send a message to the content provider using the contact information, the message including a notification of the error.

9. The system of claim 8, wherein determine contact information for the content provider includes determine a domain associated with the content provider and one of the following:
   construct an email address by adding a role username to the domain; and
   look up the domain in a database including contact information for the domain.

10. One or more computer-readable media having embodied thereon computer-readable instructions that, when executed, perform a method of applying a policy associated with a content provider to handle an error message received from the content provider in response to a request from a user device, the method comprising:
   receiving from a gateway an error reply from the content provider in response to the request from the user device;

generating a reply to the user device based on the error reply, wherein the reply to the user device includes an indication of one or more user-agent measures for the user device to perform, the user-agent measures selected from the set consisting of
- A) updating a durable resource identifier to point to a new location for a resource,
- B) updating a service identifier to point to a new provider of the service,
- C) modifying an existing caching policy for the content provider, and
- D) retrying the request at a specified future time.

11. The media of claim 10, wherein the method further includes receiving from the user device one or more remediation policies, wherein each remediation policy identifies an error condition and one or more remediation measures to perform in response to the error condition, the one or more remediation measures being selected from the set consisting of:
- A) forwarding an error reply indicating the error condition unchanged;
- B) providing cached content;
- C) rewriting the error reply to include a redirection to an alternate page;
- D) rewriting the error reply to include an alternate status code;
- E) providing a standardized error page in place of the error reply provided by the content provider;
- F) resending the request to an alternate content provider; and
- G) redirecting future requests sent to the content provider to the alternate content provider.

* * * * *